(12) United States Patent
Perkins et al.

(10) Patent No.: US 7,109,822 B2
(45) Date of Patent: Sep. 19, 2006

(54) METHOD AND APPARATUS FOR RAPID PROTOTYPING OF MONOLITHIC MICROWAVE INTEGRATED CIRCUITS

(75) Inventors: Thomas O. Perkins, Bedford, NH (US); Stephen J. Uurtamo, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 10/787,577

(22) Filed: Feb. 26, 2004

(65) Prior Publication Data

US 2005/0190009 A1 Sep. 1, 2005

(51) Int. Cl.
*H01P 5/12* (2006.01)

(52) U.S. Cl. .............................. 333/100; 333/4; 333/5; 333/102; 264/401

(58) Field of Classification Search ................ 333/102, 333/4, 5, 100; 264/401
See application file for complete search history.

(56) References Cited

U.S. PATENT DOCUMENTS

| | | | | |
|---|---|---|---|---|
| 4,531,298 A | * | 7/1985 | West, Jr. ...................... | 33/301 |
| 5,057,906 A | * | 10/1991 | Ishigami ..................... | 257/766 |
| 6,455,925 B1 | | 9/2002 | Laureanti | |
| 6,562,278 B1 | * | 5/2003 | Farnworth et al. .......... | 264/401 |
| 6,711,084 B1 | * | 3/2004 | Ishida et al. ................ | 365/226 |
| 6,785,138 B1 | * | 8/2004 | Rapey ........................ | 361/704 |
| 6,791,437 B1 | * | 9/2004 | Hagn et al. ................. | 333/195 |
| 6,798,295 B1 | * | 9/2004 | Pengelly et al. ............ | 330/295 |
| 6,815,220 B1 | * | 11/2004 | Crawford et al. ............... | 438/3 |
| 6,856,250 B1 | * | 2/2005 | Hilliard .................... | 340/573.2 |
| 6,891,730 B1 | * | 5/2005 | Farassat ...................... | 361/769 |
| 6,903,458 B1 | * | 6/2005 | Nathan ........................ | 257/737 |

OTHER PUBLICATIONS

PCT International Search Report dated Jul. 12, 2005 of International Application No. PCT/US05/03974 filed Feb. 8, 2005.

* cited by examiner

*Primary Examiner*—Robert Pascal
*Assistant Examiner*—Kimberly Glenn
(74) *Attorney, Agent, or Firm*—Daniel J. Long; Robert K. Tendler

(57) ABSTRACT

A system is provided for rapidly prototyping monolithic microwave integrated circuit modules to provide an experimental structure that can be physically made to operate by stereolithographically rendering an SLA part directly from the designer's drawings and by coating the part with a conductive layer, with the smoothness being better than 0.001 inch and with the dimensional accuracy being better than 3 mils for some applications. In one embodiment, the coating for the SLA model is made from either rhodium or gold having a thickness of less than $\frac{1}{10,000}^{th}$ of an inch, with a nickel barrier being first deposited followed by the gold. The particular SLA plastic is a high temperature plastic to prevent bubbling during the metal deposition step which in one embodiment involves sputtering. The coated model has a microfinish of Ra<0.001 inch, with active devices being electrically attached to the coating through the use of conductive adhesives or eutectic solder. This provides a device in which active devices are attached to the layer without soldering and without introduction of heat which might destroy the metallized layer and alter and the critical dimensions.

16 Claims, 4 Drawing Sheets

METHOD AND APPARATUS FOR RAPID PROTOTYPING OF MONOLITHIC MICROWAVE INTEGRATED CIRCUITS

FIELD OF INVENTION

This invention relates to rapid prototyping of microwave modules and more particularly to the utilization of metal coating of a stereolithographic assembly (SLA) model for the provision of a physical model that can function as an active microwave electronic circuit suitable for testing and demonstration.

BACKGROUND OF THE INVENTION

Microwave and monolithic microwave modules have been formed in which the circuits themselves are mounted into a passive electrically conductive housing or carrier and have active electronic elements such as filters, mixers, switches, amplifiers, and the like epoxied or soldered to the interior of the housing, with a top lid hermetically sealing the housing. The devices are made of plates or sheets of conductive material such as metals which have to be manufactured by ion milling to exceedingly high tolerances.

The reason for the high tolerances is that one seeks to minimize losses through the monolithic microwave integrated circuit, with the losses resulting from dimensional inaccuracies which can cause detuning of the circuit because it varies the propagation structure and because roughened surfaces result in mismatches and/or circuit losses.

In order to provide a prototype for a final microwave assembly, the prototyping process in the past has required multiple different steps starting with the circuit designer. The circuit designer will design a module utilizing some sort of drawing. The drawing is then transferred to a machine shop which requires that the drawing be put in a CAD CAM format so that a solid blank of material can be hogged out and then microfinished to the required dimensions by etching, grinding or milling. This requires a numerical control (NC) tape, with the milled product then being transferred to a plating shop at which point, for instance, gold plating is sputtered onto an appropriately patterned metal housing.

Because of the multiple steps involved, oftentimes, the resulting prototype doesn't fit or is improperly dimensioned so that one then has to go back through the above process in order to provide a prototype model that will operate properly.

It will be appreciated that in monolithic microwave integrated circuits, a number of active elements are soldered or conductive-epoxied to the plating in order to provide for the appropriate functioning of the circuit.

While soldering per se is not a problem when the module housing is made of solid metal, it does become a problem if other housing materials are utilized.

The above process may take a matter of several weeks in order to provide a prototype which is testable and for this reason there is a need for a rapid prototyping process which reduces costs and turnaround time to hours or days.

SUMMARY OF THE INVENTION

Rather than utilizing milling techniques for hogging out a billet of metal in order to provide the housing portion of the circuit, in the subject invention, a stereolithographic rendering is made directly from the designer's drawings.

In one embodiment, the stereolithographic assembly (SLA) is provided by building up or ablating a high temperature plastic, with the high temperature plastic being required for a subsequent plating or sputtering process in which conductive metal is sputtered or plated onto the plastic to provide the conductive surface for the housing.

In one embodiment, when utilizing gold, a nickel coating is first deposited followed by the sputtering of the gold, with the gold surfaces provided with a microfine finish so that circuit losses are minimized and so as to preserve dimensional accuracy. Moreover, rather than soldering the active elements to the housing as was done in the past, conductive adhesive is utilized for electrically connecting and mounting the active elements to the sputtered conductive layer.

The housing itself is made of a material which has a temperature coefficient of expansion such that upon heating in the metallizing process the originally designed dimensions as well as edges and corners are maintained. The plastic in one embodiment is of a high temperature material such that the sputtering temperatures utilized in the sputtering process do not result in bubbling of the metallized coating when, for instance, metal flash techniques are utilized to provide the housing with the appropriate layer. In one embodiment, the layer is less than or $1/10,000^{th}$ of an inch in thickness which while satisfactory for prototyping purposes is not necessarily desirable if the active components are to be soldered to the housing. Moreover, in the subject process the active components are mounted with conductive adhesive such as a silver epoxy, thus eliminating the requirement for the application of heat.

Moreover, the prototype is in general designed for low temperature applications where heat sinks need not be provided.

The result is a non-metallic structure which is much lighter than the brassboard prototyping utilized in the past, with the smoothness of the finish for the housing walls and the metallization reducing losses associated with the propagation structure of the wave energy altered by dimensional and surface factors.

Thus the key to the subject invention is a microfine surface having a roughness (surface height deviation, Ra) less than $1/1000^{th}$ of an inch, along with the holding of tight tolerances of +/−3–5 mils through the utilization of high temperature plastics and currently available SLA processes. Note that Ra is specified by ASME in Standard B46.1-1995.

The above addresses the issue of the propagation structure of wave energy which requires very smooth, very light, very tight tolerance structures which when completed in a clam shell type structure by snapping together the parts results in a structure that can be physically made to operate. Thus signal reduction or loss is kept to a minimum due to the microfine surface structure which if rough can cause detuning or changes in the waveguide frequency cut-off. When the microwave module is configured as a high pass filter, the frequency cut-off is controllable through the use of the subject technique especially when, for instance, transformers are internally installed in the microwave housing.

It is thus possible with the stereolithographic rendering and coating techniques to prepare a suitable prototype in a matter of days as opposed to a matter of weeks and to be able to physically try out an idea and validate that it works in a very short period of time and at lower cost.

In summary, a system is provided for rapidly prototyping monolithic microwave integrated circuit modules to provide an experimental structure that can be physically made to operate by stereolithographically rendering an SLA part directly from the designer's drawings and by coating the part with a conductive layer, with the smoothness being better than 0.001 inch and with the dimensional accuracy being better than 3 mils for some applications. In one embodiment, the coating for the SLA model is made from either rhodium or gold having a thickness of less than $1/10,000^{th}$ of an inch, with a nickel barrier being first deposited followed by the gold. The particular SLA plastic is a high temperature plastic to prevent bubbling during the metal deposition step which in one embodiment involves sputtering. The coated model has a microfinish of Ra<0.001 inch, with active devices being electrically attached to the coating through the use of conductive adhesives or eutectic solder. This provides a device in which active devices are attached to the layer without soldering and without introduction of heat which might destroy the metallized layer and alter and the critical dimensions.

BRIEF DESCRIPTION OF THE DRAWINGS

These and other features of the subject invention will be better understood in connection with the Detailed Description in conjunction with the Drawings, of which.

DETAILED DESCRIPTION

Prior to discussing the housing and the criticality of the dimensions, it will be appreciated that microwave integrated circuits have components such as conductors, inductors, capacitors, resistors and active circuits which must be positioned relative to the housing with tolerances in the range of thousandths of an inch. What this means is that when one seeks to design a housing into which the components are to fit, there are some critical dimensions which become operative due to the microwave frequencies.

Rather than simply locating components on a circuit board in an indiscriminate fashion, one needs to pay attention to various dimensions because the wavelengths are so short. If the placement of a part or positioning of a line or trace is inconsistent with good design practice, the performance of the circuit can be degraded or can even be unacceptable.

For instance, misplacement of the components may cause detuning and may cause undesirable reflections, because the circuit size is on the same order as the wavelength of the energy it handles. Thus the placement of the parts becomes increasingly critical when one gets above 1,000 megahertz or one gigahertz.

As an example, if the input pin to a microwave integrated circuit is misaligned with the input trace on a printed circuit carried in the housing, then one can have a very high VSWR. Moreover, for microwave switches, especially diode switches, if the diodes are improperly positioned, instead of getting a switch action, one can get a splitting action or a cross-coupling.

Further, it is extremely important to have a housing with a very smooth surface to bond to so that one gets a uniform ground distribution substrate. If one does not have a uniform ground, one gets a non-uniform response from the circuit.

Additionally, for the channels or walls of the structure, they must be co-planar in structure to within several thousandths of an inch.

As a further consideration, it is important with all microwave circuits to prevent unwanted modes from propagating within the housing. For energy propagating in an unintended mode, one can get resonances, reinforcements or cancellations. In summary, one has to satisfy boundary conditions that establish the dimensions of the circuit.

Figure 1:
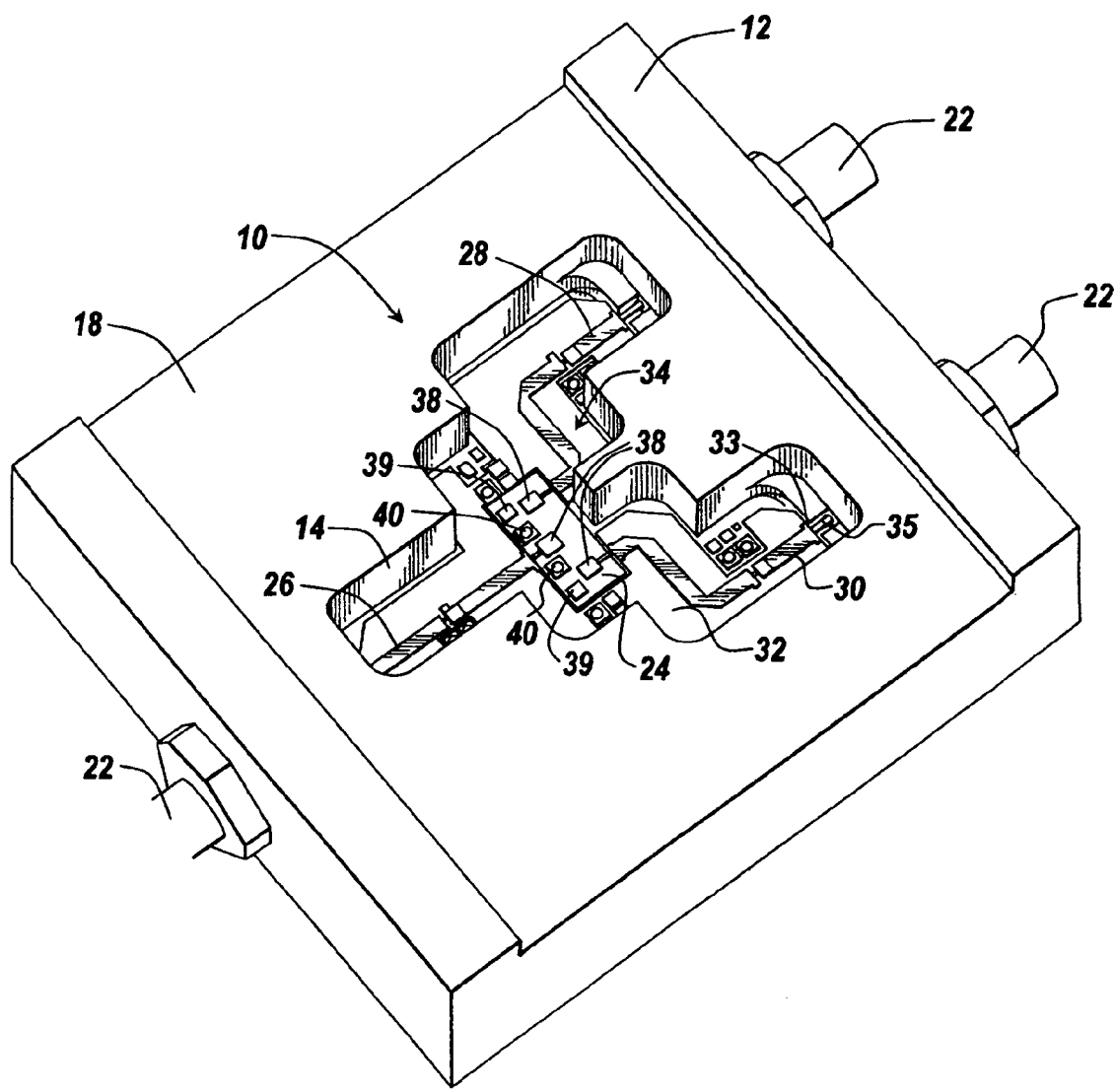
FIG. 1 is an isometric view of a monolithic microwave integrated circuit in the form of a switch showing a metallized SLA model with components and/or a circuit board to be adhesively mounted in a housing.

Referring now to FIG. 1, in order to rapidly prototype a monolithic microwave integrated circuit 10, one forms an SLA model or housing 12 coated with a conductive layer. The coating may be patterned to exist at least along the inside wall 14 of model 12, along the bottom of the housing and along a peripheral top lip 18 such that the coated walls form a housing.

What is provided is a metallized non-conductive housing made with SLP techniques. The coated housing has electrical properties which duplicate that which would be expected from a brassboard prototype including a metallized hogged out and milled housing. Note that the active components may be a transformer, an amplifier, circuit diodes, or may be, for instance, an inductor used to give the monolithic microwave integrated circuit certain characteristics so as to provide a filter, an amplifier, a mixer, a circulator switches, or other microwave circuits.

For illustrative purposes, what is pictured in FIG. 1 is a monolithic microwave integrated circuit in the form of a microwave switch. It has connectors 22 serving as input and output connectors, with the output being switched by a diode switching circuit 24 such that signals on trace 26 are switched between trace 28 and trace 30.

As can be seen, an integrated circuit substrate or circuit board 32 carries traces 26, 28 and 30, with diode switch circuit 24 also carried by the integrated circuit board.

With all of the components, either passive or active, mounted on the integrated circuit board, it is very important that the circuit board fit tightly within the microwave cavity 34 formed by walls 14 and housing 12. As can be seen, the integrated circuit board fits within the cavity so snugly that, for instance, an end 33 of trace 30 is directly aligned with a pin 35, which extends into cavity 34 from the associated connector.

As mentioned hereinbefore, any misalignment either in the lateral or vertical direction of pin 35 with respect to end 33 of trace 30 can cause intolerable VSWR to occur.

Also, the placement of various active and passive elements, while being mounted on the integrated circuit board 32, still must be placed at predetermined distances from walls 14 of cavity 34. For instance, microwave integrated circuit chips 38, which carry numbers of active and passive components, must have their positions at rigidly specified distances from wall 14 of housing 12 so that the circuit will operate properly. Also the placement of capacitors 39 and inductors 40 for DC switch biasing must likewise be precise.

Thus the microwave switch of FIG. 1 has a number of capacitors 39 and inductors 40, the proximity of which to walls 14 is critical to the proper operation of the circuit.

This being the case, it is very important to not only properly locate the active and passive components on printed circuit board 32, but also one must be doubly sure that printed circuit board 32 is exactly positioned with respect to the walls of cavity 34 and fit tightly within the cavity.

Figure 2:
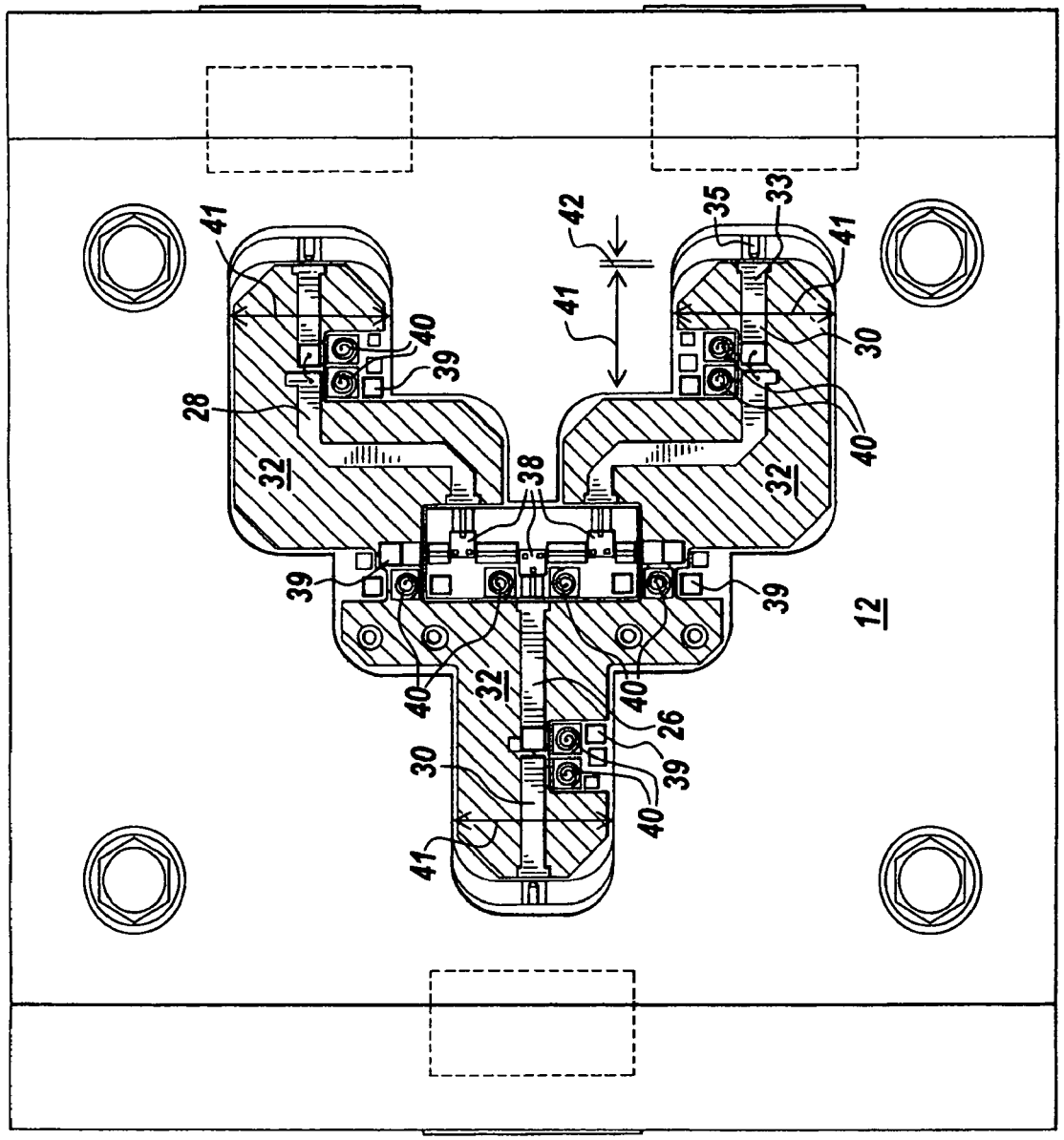
FIG. 2 is a top view of the SLA part of FIG. 1 showing the placement of the active and passive parts therein.

Referring to FIG. 2, a schematic top view of the microwave switch of FIG. 1 is shown in which the various components shown in FIG. 1 are noted as having like reference characters. Here it will be seen that there are critical dimensions for wall 14 as illustrated by double-ended arrows 41. In short, it can be seen that if printed circuit board 32 is not precisely positioned within cavity 34, then various tight tolerances cannot be honored. For instance, as can be seen by double-ended arrow 42, then unacceptable VSWR can occur if the input pin is not exactly positioned relative to the trace to which it is to be connected.

It will also be appreciated that for a switch having a multiplicity of inductors, capacitors and resistors along with active devices, the mode of propagation of the signals within the housing is critically dependent upon the accuracies to which the channelizing and other wall features can be formed.

Figure 3:
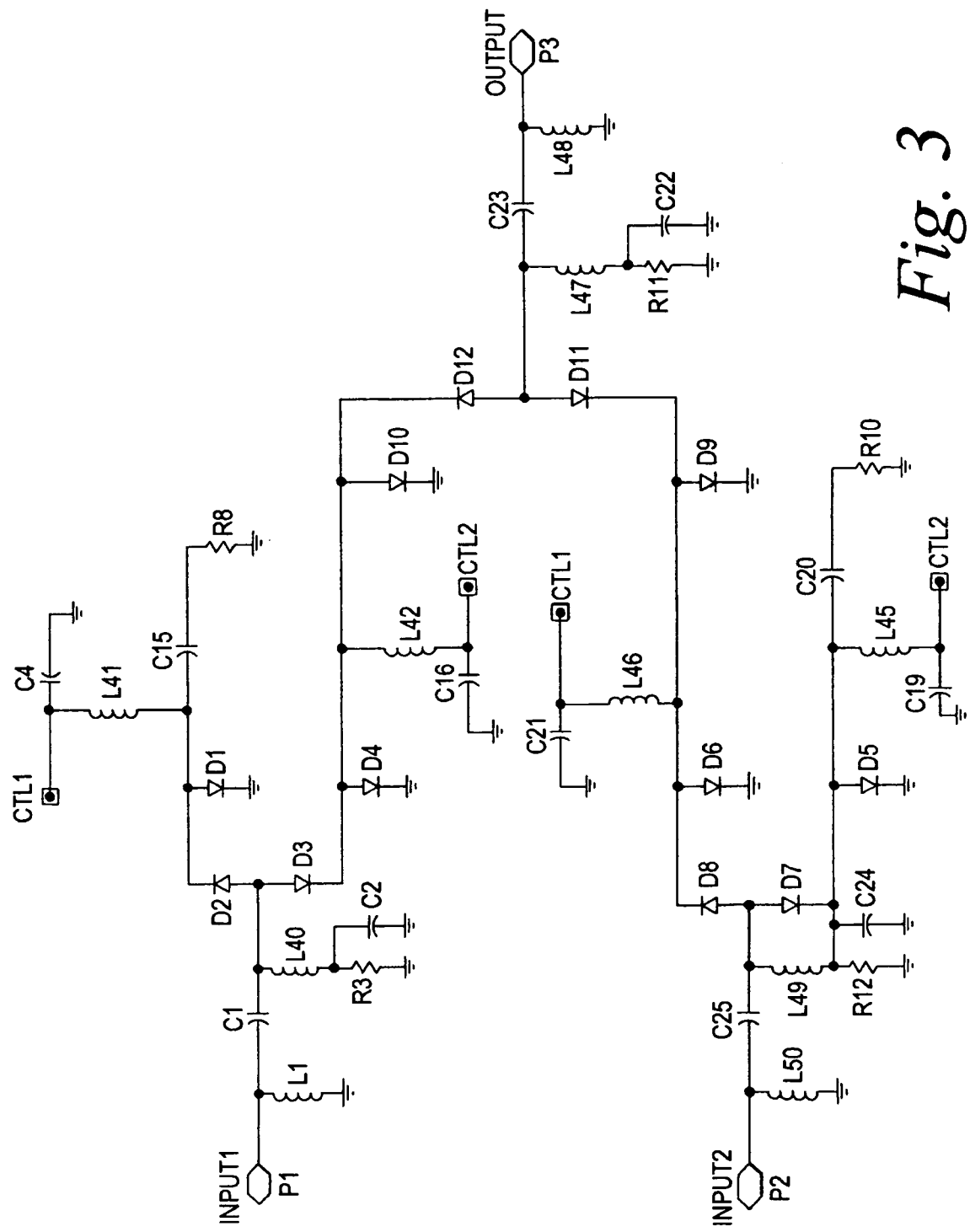
FIG. 3 is a schematic diagram of the monolithic integrated circuit of FIGS. 1 and 2; and, FIG. 4 is a flow chart for the process of making the housing of FIG. 1 to produce a finished prototype.

FIG. 3 shows a simplified schematic drawing of the switch of FIG. 1, indicating the number of active and passive components which must be properly positioned through location on a printed circuit board that must in turn be located precisely to the housing.

It is obviously important that one be able to provide rapid prototyping for such microwave integrated circuits and to be able to quickly reshape the housing when design errors are uncovered.

As is usual, the top of the housing may be sealed with a top plate (not shown) which may be hermetically sealed to top lip 18 of the housing.

There are several factors which contribute to the lossy microwave circuits. The first is the smoothness of the metallization layer which is to desireably have a microfine structure having a roughness less than Ra<0.001 inch.

Were the interior surfaces of the housing to have a roughness exceeding 0.001 inch, then the wave propagation characteristics would be altered, in some cases resulting in detuning.

More importantly, if the dimensions of the housing are not exact, then displacement of the edges of wall 14 may cause detuning or may cause the high frequency cut-off of a high pass filter to change.

There are other structures within the housing which also are critical in terms of dimensional accuracy. All of these dimensions are critical as to the wave propagation within the housing and any changes in the position of these edges can result in detuning or changes in frequency response.

What will therefore be appreciated is that while it is possible to control the roughness of the interior walls of a brassboarded prototype as well as critical dimensions, it is not immediately obvious how critical surface smoothness and dimensional accuracies can be achieved when using SLA techniques.

Figure 4:
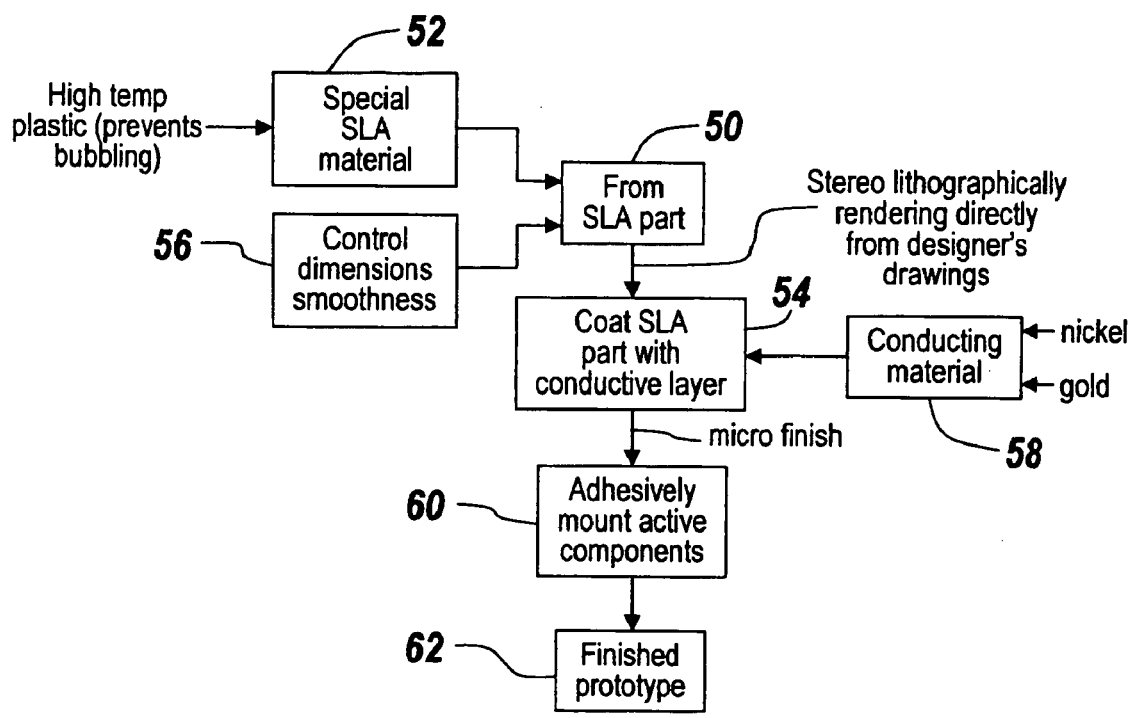

Referring to FIG. 4, in order to form an SLA part as illustrated at 50 one utilizes a specialized SLA material 52 which in a preferred embodiment is a high temperature plastic, the temperature characteristics of which prevent bubbling of the subsequently applied metallization layer when the coating process is performed. As illustrated at 54 the SLA part formed is coated with a layer of conductive material 58 usually through sputtering which involves a temperature bath in excess of 1064° C. In one embodiment, the gold layer is preceded with a nickel metallization layer which is deposited at a temperature of 1455° C. While nickel and gold are deposited at the aforementioned processing temperatures, rhodium which can be substituted is deposited at a temperature of 1964° C. The smoothness of the resultant layer is controlled at 56 in the formation of the SLA part. The resultant coated part has a suitable microfinish to which a circuit board with active or passive components is adhesively mounted as shown in 60. Upon mounting of the board within the cavity of the SLA part and sealing with a conductive cover, one has a finished prototype as illustrated at 62.

It will be appreciated that the high temperature plastic which is utilized to form the SLA part must not deform or otherwise structurally become degraded at these deposition temperatures.

In terms of SLA part production, various standard SLA manufacturing processes are included within the scope of this invention. It is important that one control the dimensions and smoothness of the finished part and to do this, standard SLA manufacturing techniques may be employed.

When a part having the appropriately configured housing dimensions and smoothnesses is provided, conductive metallization is applied to the part through sputtering, flash coating, or any other process which can provide a microfinish having a finish roughness less than 0.001 inch.

Note that both active and passive components may be adhesively mounted in the housing so that with the addition of a hermetically sealing plate, a finished and testable prototype results. What will be appreciated is that one goes directly from the designer's drawings to an SLA part, completely bypassing the cutting of a metal blank either by ion milling, preferential etching, grinding or other procedures.

As mentioned hereinbefore, the process of providing a brassboard type structure is on the order of two weeks time, whereas providing an SLA part and flash coating it can be accomplished in a matter of days.

Thus what is provided is a prototype which is considerably less costly to manufacture than the brassboard prototypes of the past, and can be formed in a rapid fashion to provide both testability and demonstrability for the specific monolithic microwave integrated circuit.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A method for rapidly prototyping an active monolithic microwave integrated circuit, comprising the steps of:
    forming a housing using stereolithographic techniques;
    providing a metallization layer on selected surfaces of the housing such that the selected metallized surfaces provide walls having a roughness, Ra, less than 0.001 inch; and,
    mounting a device on the metallized surface.

2. The method of claim 1, wherein the device includes an active device.

3. The method of claim 1, wherein the housing is made of plastic.

4. The method of claim 3, wherein the plastic is a high temperature plastic.

5. The method of claim 4, wherein the step of providing a metallization layer includes raising the metal to its melting temperature, and wherein the high temperature plastic can withstand the melting temperature associated with providing the metallization layer.

6. The method of claim 1, wherein the metallization layer includes gold.

7. The method of claim 6, wherein the thickness of the layer is less than $1/10,000^{th}$ of an inch.

8. The method of claim 6, wherein the gold metallization layer is preceded with a layer of nickel.

9. The method of claim 1, wherein the initialization layer includes rhodium.

10. The method of claim 1, wherein the mounting step includes a conductive adhesive.

11. The method of claim 10, wherein the conductive adhesive includes a silver paste.

12. The method of claim 2, wherein the active device includes an amplifier.

13. The method of claim 2, wherein the active device includes a filter.

14. The method of claim 2, wherein the active device includes an inductor.

15. The method of claim 2, wherein the active device includes a capacitor.

16. The method of claim 2, wherein the active device includes a switch.

* * * * *